March 24, 1925.                                                          1,530,680
P. P. LINDEN ET AL
IDENTIFICATION SEAL
Filed July 5, 1923

Inventors
Paul P. Linden
Sam Heilweil
By Attorneys

Patented Mar. 24, 1925.

1,530,680

UNITED STATES PATENT OFFICE.

PAUL P. LINDEN, OF YONKERS, AND SAM HEILWEIL, OF NEW YORK, N. Y., ASSIGNORS TO FUR PROTECTIVE SEAL CORPORATION, OF NEW YORK, N. Y., A CORPORATION OF NEW YORK.

IDENTIFCATION SEAL.

Application filed July 5, 1923. Serial No. 649,755.

*To all whom it may concern:*

Be it known that we, PAUL P. LINDEN, a citizen of the United States, residing at Yonkers, in the county of Westchester and State of New York, and SAM HEILWEIL, a subject of Austria, residing at New York, in the county of New York and State of New York, have invented certain new and useful Improvements in Identification Seals, of which the following is a specification.

This invention relates to identification seals and tags for use in connection with merchandise such as fur, cloth, hats, fabrics, and other materials and merchandise of the character which is usually handled or is likely to be handled by various persons or concerns during the manufacture thereof, and in which it is likely that the raw fur or other goods in the course of being tanned, dyed, or bleached, may become confused or co-mingled with other goods rendering it likely that exchanges of goods could or would be made thus resulting in losses to the owner of the merchandise; and the object of our invention is to produce such an identification means as will prevent such losses.

Furthermore the object of the invention is to produce an identification or protective seal and tag possessing a separate key tag or check whereby furriers may safely send raw furs, skins, and the like out to tanners and finishers without undergoing the risk of having cheaper or inferior grades of furs and merchandise substituted for their own merchandise.

A considerable loss to furriers annually occurs by reason of the fact that they have no positively satisfactory means of protection against the substitution of inferior skins during the process, of treating, finishing, defleshing and tanning skins, for the raw fur and finished product appears in such a contrasted state as regards color, texture, appearance and weight, that the owner of a tanned skin cannot successfully show that the finished product is not in fact the original fur.

As regards textiles, such as in the final stages of manufacturing silk goods and particularly when it comes to the dyeing of goods in the bolt, losses frequently occur which are ofttimes fraudulently explained by the fact that the goods drew up by shrinkage and the linear measurement of the goods in the bolt comes one or two yards short by reason of such shrinkage, whereas in fact the loss in yardage of silk or other cloth occurs by reason of the fact that a portion of the end of the bolt is cut off and removed by irresponsible persons; and in this connection it is an object of our invention to provide an identification seal capable of being affixed to each end of the cloth in the bolt whereby the cutting off of either end thereof would correspondingly remove the seal from the cloth, thus revealing to the true owner the fact that his losses are due to reprehensible practices against him and his property.

Furthermore, it is an object of the invention to provide such an identification seal or tag which, though it may be removed, is difficult and expensive to duplicate by reason of the key marks and numbers engraved or stamped thereon. Furthermore, a feature of the invention lies in the key tag which remains in the possession of the owner of the merchandise and by which he quickly discovers losses, if any, when the goods are returned to him.

The invention is not limited to the structure and uses as herein described, but certain changes may be made without departing from the scope of our invention. The accompanying drawing illustrates one embodiment of the invention in which:

Figure 1 shows a remnant of fur or other merchandise with our improved identification tag or seal affixed thereto.

Figure 2 shows an underneath view of the fur remnant with its identification seal turned up exposing the underneath key marks whereby the identification seal is examined to ascertain whether or not it is the original seal, or whether it is an intended duplication thereof, or a substitution for the original. In this view a particular key check is shown applied to the seal on the skin, the comparison of which enables the owner to detect any fraud as may have occurred.

Figure 2 also shows a ring full of the aforesaid key tags which the owner of the furs or other merchandise retains in his possession when the merchandise is sent out to tanners or dyers.

Figure 1:
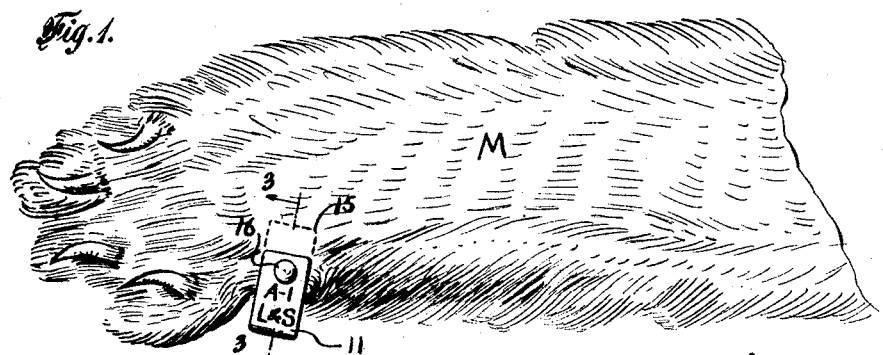
Figure 2:
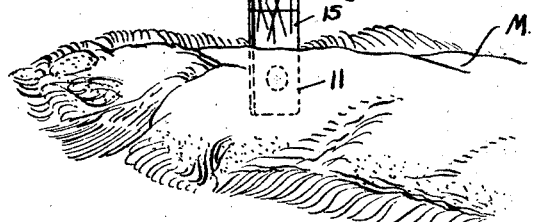
Figure 6:
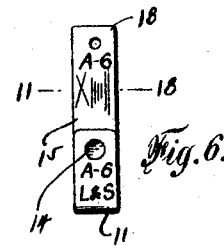

Figure 6 shows how the combined seal and key tag is made in one integral piece with the identification marks stamped or engraved thereon; and thereafter the device is cut along the plane 11—18 whereupon the article of manufacture is separated into two parts namely, the identification seal 11 and the key tag 18.

Figure 7:
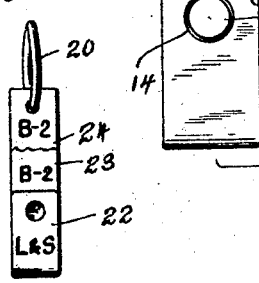
Figure 4:
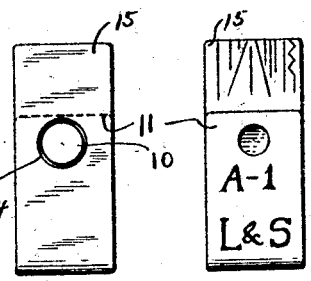
Figure 4 shows a front and rear view of the seal separated from the merchandise.

Figure 7 illustrates a modified form of the invention in which the identification seal and key tag are formed of the same piece of material and thereafter are broken off to leave ragged irregular mating edges between the key tag and identification seal; and in this form of the invention, the discovery of deception, fraud, or substitutions is effected by matching up the seal with its particular key tag.

The identification seal may be manufactured of light weight soft malleable metal such as copper or tin in order that it may be quickly applied to the fur or merchandise by an automatic machine or punch. It consists of a strip of metal having a swedged in, punched, or drawn locking or riveting head 10 made on one end of the metal strip 11, and the strip 11 is bent back upon itself at 12 thus providing a portion 13 for receiving a stamp or impression of the manufacturer or owner's name as well as a stamping or imprint of the key number series of the seal. A hole 14 is punched in the metal strip, and the head 10 is projected through the hole when the seal is fixed to the skin or other merchandise and then the head is riveted down to permanently attach the seal to the fur. The extremity 15 of the seal or strip of metal is made of such appropriate length as will enable the identification marks to be stamped, engraved or pressed thereon; and in Figure 6 the length of the strip is shown before the end thereof is cut off to provide the owner with his key tag 18 which he retains in his possession when he makes shipment of the raw furs to tanners and finishers.

Figure 3:
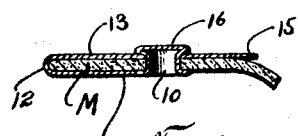
Figure 3 illustrates a cross sectional view of the tag with a skin or other merchandise shown attached thereto.
Figure 5:
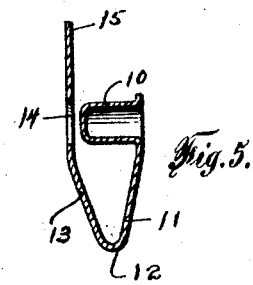
Figure 5 illustrates a longitudinal sectional view of the seal before it has been applied and affixed to the merchandise, such view being considered as taken centrally and longitudinally through either of the sketches shown in Figure 4.

The detail structure of the identification seal is shown in Figure 5 as spread apart and possessing the riveting head 10 of substantial length, and after the seal has been affixed to the fur piece or merchandise M, the head 10 is swedged or riveted down as shown in Figure 3, which firmly clamps and anchors the seal 11 to the fur piece M or other merchandise; and the head is riveted over at 16. The seals may be rapidly applied to the merchandise by an automatic machine, and particularly by employing a small hand press which a fur buyer may conveniently carry with him and after having selected a certain lot of furs, he may on the spot affix the identification seal thereto, thus positively fixing the owner's title to the goods on the spot, thereby avoiding the possibility of having the skins changed or substituted goods supplied after the buyer leaves and before the skins are shipped.

The identification seal 11 is preferably stamped or imprinted with the name of the furrier or other manufacture such as the L. & S. Company as well as having stamped thereon a key number series such as $A^1$. They key number series $A^1$, $A^2$, etc., are important marks which enables the owner to quickly pick out his particular key tag upon receipt of the goods whereby the seal on the skin is identified and discovered as the genuine original one or as a spurious seal and inferior skin.

The end 15 of the seal is made with a series of marks or lines stamped or engraved thereon at the time the seal and key tag are manufactured as a single and integral piece as shown in Figure 6. The identification marks consist preferably of a series of parallel, diagonal, or cross lines stamped upon the metal strip in such a manner that the said lines are impressed upon the end 15 and the part 18. After this article of manufacture is engraved or stamped with the marks applied thereto, it is cut along the plane or line 11—18 thus separating it as shown in Figure 3 into two distinct parts, namely, the seal 11 and the identification tag 18; and the abutting ends of the two parts positively correspond and mate or match up with each other by reason of the fact that the identification marks were applied to the piece at the time it was manufactured and before it was cut into two separate pieces. Preferably no two seals and tags bear the same identifying marks or indicia.

The tag 18 is provided with a key number series such as $A^1$ or $B^1$, $B^2$, etc., or a suitable designation which agrees with the key number series of the seal as already described; and this particular mark is stamped upon both parts, the seal and the key tag, for the purpose of enabling the owner to quickly pick out the particular tag 18 which matches up as to marks on the seal applied to the merchandise, for after first picking out the key tag 18 possessing the $A^1$ designation, he then may quickly compare the marks of the key to the marks on the seal of the same series.

The owner of the merchandise or stock of raw furs, retains the identification tags 18 in numerical and letter series on the key ring 20 thereby enabling him to pick out and identify all goods shipped out to furriers or tanners for finishing or tanning upon his order, and having received back from the tanners a batch of goods or furs in the A or B class he then removes from his safe the particular ring bearing the A or B series of key tags and thereupon tests the seals by applying a particular proper letter and number key tag to the same seal to test the genuineness of the marks appearing on the underneath side of the end 15 of the seal.

This procedure enables the owner to detect changes or substitutes of goods because each tag 18 and seal 11 are made of a differently arranged display of lines or marks. The manufacturer may occasionally change or alter the particular style of lines or marks on the seal and tag every season or as often as he desires, and in doing so he eliminates and discourages the practice of fraud and any attempts to duplicate his own seals for the reason that the duplication of one seal would be far too expensive and difficult to copy, and inasmuch as no two seals possess the same identification marks, the magnitude of copying them all is out of the question as far as finishers, tanners, and others are concerned.

Figure 7 portrays a modified form of seal and tag which consists of an article of manufacture in the form of a seal 22 having a portion 23 from which a key tag 24 is broken. This seal 22 is preferably made of very thin light weight metal such as spring steel or the like which may be broken and thus provide a ragged irregular or fractured edge on each piece to determine the genuineness after the goods have been returned to the owner. The owner applies the key tag 24 to the end 23 of the seal and if the irregular edges of each part match or mate with the other, it is appreciated that no change or substitute of seal has taken place by reason of the fact that a break across the metal always produces a different and irregular break line, thereby enabling one broken part to be positively distinguished from another in case one of the parts is not the original and genuine seal.

What we claim is:

1. An article of manufacture comprising a combination identification seal and separated tag constructed from a single strip of metal, means provided thereon for anchoring the seal to merchandise, and means stamped or imprinted thereon forming positive and identical identification marks on both the seal and separated key tag.

2. An article of manufacture comprising a combination identification seal and separated tag constructed from a single strip of metal, means provided thereon for anchoring the seal to merchandise, means stamped or imprinted thereon forming positive and identical identification marks on both the seal and key tag, and a key number marking series affixed to the seal and separated key tag by which the seal and tag are quickly associated and brought together.

3. An identification seal comprising a metallic strip, means thereon made to anchor said strip to merchandise, identification marks engraved or stamped on the seal, a separated key tag, and identification marks made on the key tag identical to the marks made on the seal.

4. A combination identification seal comprising a metallic strip forming a seal, means thereon made to anchor said seal to merchandise, identification marks engraved or stamped on the seal, a separated key tag, identification marks made on the key tag identical to the marks made on the seal, and a key designation series imprinted on the seal and key tag to quickly associate the proper key tag and seal.

5. An article of manufacture comprising a combination identification seal and separated tag constructed from a single strip of metal, a rivet head provided thereon for anchoring the seal to merchandise, and means stamped or imprinted thereon forming positive and identical identification marks on both the seal and key tag.

6. An article of manufacture comprising a combination identification seal and separated tag constructed from a single strip of metal, means stamped or imprinted thereon forming positive and identical identification marks on both the seal and key tag, a key number marking series affixed to the seal and key tag by which the seal and tag are quickly associated, said strip made substantially long affording suitable space to receive the identification marks, and said key tag being cut from the long strip.

7. An identification seal comprising a metallic strip, means thereon made to anchor said strip to merchandise such as fur and the like, identification marks engraved or stamped on the seal, a separated key tag, identification marks made on the key tag identical to the marks made on the seal, and a portion of said strip being bent back on itself to embrace the merchandise and be securely anchored thereto.

8. An identification seal comprising a metallic strip, means thereon made to anchor said strip to merchandise comprising a rivet head and opening to receive the head, identification marks engraved or stamped on the seal, a key tag, identification marks made on the key tag identical to the marks made on the seal, and a key number of alphabetical series imprinted on the seal and key tag to quickly associate the tag and seal, said strip being bent back upon itself to embrace the edge of the merchandise.

9. A combination seal and key tag comprising a metallic part, means thereon made to fasten said part to merchandise, and a fracture edge on the key tag and seal matched up to establish identification.

In testimony whereof we affix our signatures this 6th day of June, 1923, in the county of New York, city of New York, and State of New York.

PAUL P. LINDEN.
SAM HEILWEIL.